US010007234B2

(12) United States Patent
Lee et al.

(10) Patent No.: US 10,007,234 B2
(45) Date of Patent: Jun. 26, 2018

(54) OASLM-BASED HOLOGRAPHIC DISPLAY

(71) Applicants: SAMSUNG ELECTRONICS CO., LTD., Suwon-si (KR); CAMBRIDGE ENTERPRISE LIMITED, Cambridge (GB)

(72) Inventors: Hong-seok Lee, Seongnam-si (KR); Hoon Song, Yongin-si (KR); Kang-hee Won, Seoul (KR); Neil Collings, Linton (GB); Daping Chu, Cambridge (GB)

(73) Assignees: SAMSUNG ELECTRONICS CO., LTD., Suwon-si (KR); CAMBRIDGE ENTERPRISE LIMITED, Cambridge (GB)

( * ) Notice: Subject to any disclaimer, the term of this patent is extended or adjusted under 35 U.S.C. 154(b) by 983 days.

(21) Appl. No.: 14/294,756

(22) Filed: Jun. 3, 2014

(65) Prior Publication Data
US 2014/0375763 A1 Dec. 25, 2014

(30) Foreign Application Priority Data

Jun. 24, 2013 (KR) ........................ 10-2013-0072701

(51) Int. Cl.
*G03H 1/00* (2006.01)
*G03H 1/22* (2006.01)
*G03H 1/02* (2006.01)

(52) U.S. Cl.
CPC ............ *G03H 1/2294* (2013.01); *G03H 1/02* (2013.01); *G03H 2001/2239* (2013.01);
(Continued)

(58) Field of Classification Search
CPC ................... G03H 1/2294; G03H 1/02; G03H 2001/2239; G03H 2223/17;
(Continued)

(56) References Cited

U.S. PATENT DOCUMENTS 4,114,991 A 9/1978 Bleha, Jr. et al.
5,517,279 A 5/1996 Hugle et al.
(Continued)

FOREIGN PATENT DOCUMENTS

EP 1 023 631 B1 11/2004
KR 10-2012-0010554 A 2/2012
(Continued)

OTHER PUBLICATIONS

Roach, et al., "Resolution of Electrooptic Light Valves", IEEE Transactions on Electron Devices, Aug. 1974, pp. 453-459, vol. ED-21, No. 8.
(Continued)

*Primary Examiner* — Zachary Wilkes
*Assistant Examiner* — George G King
(74) *Attorney, Agent, or Firm* — Sughrue Mion, PLLC

(57) ABSTRACT

Provided is an optically addressable spatial light modulator (OASLM)-based holographic display and a method of operating the same. The display includes an addressing unit including a light source unit emitting a plurality of recording beams, a driving mirror array including driving mirrors that each reflect a recording beam incident thereon, and a mirror member array including mirror members that each obliquely reflect a recording beam incident thereon, in which each of the driving mirrors corresponds to one of the mirror members. The recording beams, which are transmitted by the addressing unit, are focused onto the OASLM by micro lenses of a lenslet array. The OASLM is optically addressed by the recording beams focused by the micro lenses of the lenslet array and thus modulates and diffracts a reproduction beam, incident thereon from a reproduction beam providing unit, and thus a holographic image is reproduced.

20 Claims, 7 Drawing Sheets

(52) U.S. Cl.
CPC ..... *G03H 2223/17* (2013.01); *G03H 2223/19* (2013.01); *G03H 2223/24* (2013.01); *G03H 2225/25* (2013.01); *G03H 2227/03* (2013.01); *G03H 2240/56* (2013.01); *G03H 2240/61* (2013.01)

(58) Field of Classification Search
CPC .......... G03H 2223/19; G03H 2223/24; G03H 2225/25; G03H 2227/03; G03H 2240/56; G03H 2240/61; G03H 1/0005; G03H 1/2205; G03H 2001/0224; G03H 1/2286; G03H 1/2249; G03H 2001/0212; G03H 2001/221; G03H 2222/34; G03H 1/041; G03H 1/08; G03H 2001/2292; G03H 2225/52; G03H 1/0841; G03H 2225/33; G03H 2210/22; G03H 2225/24; G03H 2225/55; G03H 2225/11; G03H 2225/34; G03H 2225/21; G03H 2226/00; G03H 2240/13; G02B 5/32
USPC .......................................................... 359/23
See application file for complete search history.

(56) References Cited

U.S. PATENT DOCUMENTS

| | | | |
|---|---|---|---|
| 6,654,156 B1* | 11/2003 | Crossland | ............ H04N 5/7458 348/751 |
| 6,665,108 B2 | 12/2003 | Brown et al. | |
| 7,379,219 B2 | 5/2008 | Payne | |
| 7,403,338 B2 | 7/2008 | Wu et al. | |
| RE43,515 E | 7/2012 | Gui | |
| 2005/0200821 A1* | 9/2005 | Gui | ..................... G03F 7/70291 355/67 |
| 2012/0086994 A1 | 4/2012 | Choi et al. | |
| 2014/0035959 A1* | 2/2014 | Lapstun | ............. H04N 13/0402 345/690 |

FOREIGN PATENT DOCUMENTS

| | | |
|---|---|---|
| KR | 10-2012-0037209 A | 4/2012 |
| WO | 00/75698 A1 | 12/2000 |

OTHER PUBLICATIONS

Gruneisen, et al., "Programmable diffractive optics for wide-dynamic-range wavefront control using liquid-crystal spatial light modulators", Optical Engineering, vol. 43 No. 6, Jun. 2004, pp. 1387-1393, Society of Photo-Optical Instrumentation Engineers.

Collings, et al., "Liquid-crystal light valves as thresholding elements in neural networks: basic device requirements", Applied Optics, May 10, 1994, pp. 2829-2833, vol. 33, No. 14.

Wick, et al., "Deformed-helix ferroelectric liquid-crystal spatial light modulator that demonstrates high diffraction efficiency and 370-line pairs/mm resolution", Applied Optics, Jun. 10, 1999, pp. 3798-3803, vol. 38, No. 17.

Stanley, et al., "3D electronic holography display system using a 100 Mega-pixel spatial light modulator", Optical Design and Engineering, pp. 297-308, Proceedings of SPIE vol. 5249, Holographic Imaging LLC 2003, Downloaded From: http://spiedigitallibrary.org/ on Oct. 4, 2013.

* cited by examiner

OASLM-BASED HOLOGRAPHIC DISPLAY

CROSS-REFERENCE TO RELATED APPLICATION

This application claims priority from Korean Patent Application No. 10-2013-0072701, filed on Jun. 24, 2013, in the Korean Intellectual Property Office, the disclosure of which is incorporated herein in its entirety by reference.

BACKGROUND

1. Field

Methods and apparatuses consistent with exemplary embodiments relate to an optically addressable spatial light modulator (OASLM)-based holographic display.

2. Description of the Related Art

In recent years, there has been an increasing demand for three-dimensional (3D) image display devices capable of more realistically and effectively displaying an image in various fields such as movies, games, advertisements, medical images, education, or military. Thus, various techniques for displaying a 3D image have been suggested, and various 3D image display devices have been already commercialized. 3D image display devices that are currently commercialized operate based on the principle of binocular parallax caused by the distance between the left and right eyes. Such 3D image display devices provide an image for the left eye and an image for the right eye, which have different viewpoints with respect to the left eye and the right eye of a viewer, so that the viewer may perceive a 3D effect. 3D image display devices are classified into glasses type 3D image display devices requiring use of special glasses and non-glasses type 3D image display devices not requiring use of glasses.

In the case of stereoscopy type display devices using the principle of binocular parallax, severe eyestrain may occur, and only two viewpoints of an image: for the left eye and an image for the right eye are provided, and thus, a viewpoint variation according to the movement of a viewer may not be accounted for. Therefore, there is a limitation in providing a natural 3D effect. In order to more naturally display a stereoscopic image by addressing this limitation, a holographic display technology has been investigated.

In the holographic display technology, when a hologram having recorded therein an interference fringe, which is obtained by interference between a laser beam reflected from an original object and a reference beam, is irradiated with the reference beam and then the reference beam is diffracted, an image of the original object is reproduced. A holographic display technology that is currently used provides a computer generated hologram (CGH) as an electrical signal to a spatial light modulator rather than obtaining a hologram by directly exposing an original object to light. A 3D image may be generated by the spatial light modulator diffracting a reference beam in response to a CGH signal to be input.

In such a holographic display technology, in order for a reproduced 3D image to have a sufficient resolution and viewing angle (that is, in order for a reproduced 3D image to have a large space bandwidth), the performance of a spatial light modulator is important. In a general electrically addressable spatial light modulator (EASLM), a driving circuit and a wiring line are disposed in each pixel, and thus, there is a limitation in reducing the size of the pixel. Thus, a holographic display using an optically addressable spatial light modulator (OASLM) has been suggested. Since an OASLM includes a photoelectric conversion layer that is disposed on a surface on which a recording beam is incident, the OASLM may selectively turn on only pixels of a region on which the recording beam is incident. As an OASLM does not require an additional driving circuit and wiring line, the resolution requirements may be improved.

SUMMARY

One or more exemplary embodiments may provide methods and apparatuses for an OASLM-based holographic display capable of reproducing a high quality 3D hologram image by reducing the size of a spot of a recording beam irradiated on the OASLM so as to more effectively diffract a modulated reproduction beam.

Additional exemplary aspects will be set forth in part in the description which follows and, in part, will be apparent from the description, or may be learned by practice of the presented embodiments.

According to an aspect of an exemplary embodiment, an optically addressable spatial light modulator (OASLM)-based holographic display includes an addressing unit including, so as to provide recording beams that are modulated on the basis of hologram information about a stereoscopic image, a light source unit for providing recording beam, a driving mirror array including driving mirrors that are arranged at predetermined intervals and each of the driving mirrors reflects a recording beam incident thereon, and a mirror member array including mirror members that are arranged at predetermined intervals and each of the mirror members obliquely reflects a recording beam incident thereon, in which the driving mirrors and the mirror members respectively correspond to each other; a lenslet array including an array of micro lenses for focusing the recording beams which are incident thereon from the addressing unit; and a reproduction beam providing unit for providing a reproduction beam; wherein an OASLM is optically addressed by the recording beams provided from the addressing unit and focused by the micro lenses of the lenslet array and thus modulates and diffracts the reproduction beam incident thereon from the reproduction beam providing unit, so that a holographic imaged is reproduced.

The light source unit may turn on and turn off the recording beam on a pixel-by-pixel basis based on the hologram information about a stereoscopic image. Each of the mirror members of the mirror member array may obliquely reflect a recording beam which is incident thereon from the light source unit. Each of the driving mirrors of the driving mirror array may scan the recording beam, which is incident thereon from one of the mirror members of the mirror member array, to form a plurality of pixel images on the OASLM with respect to each of the micro lenses of the lenslet array.

The light source unit may include a self-emitting light source, which is pixilated, for providing a plurality of recording beams which are modulated on the basis of hologram information about a stereoscopic image.

The light source unit may include a light source; and a spatial light modulator for modulating recording beams incident thereon from the light source on a pixel-by-pixel basis, based on the hologram information about a stereoscopic image, and thus providing the recording beam being modulated.

The addressing unit may further include a first lens array for focusing the recording beams emitted from the light source unit; and a second lens array for condensing the recording beams focused by the first lens array and then dispersed so that the recording beams are collimated. The first lens array and the second lens array may respectively correspond to each other on a one-to-one basis.

Lenses of the second lens array may be arranged so as to transmit the recording beams through intervals between the driving mirrors of the driving mirror array.

The second lens array may be located on an optical path between the first lens array and the driving mirror array.

The light source unit may include a light source for emitting a continuous recording light. The driving mirrors of the driving mirror array may modulate the plurality of recording beams by turning on and turning off the recording beams incident thereon from the light source, based on hologram information about a stereoscopic image. The mirror members of the mirror member array may obliquely reflect the recording beams on a pixel-by-pixel basis, which have been reflected by the driving mirrors of the driving mirror array and are incident thereon, so as to cause the recording beams to be directed toward the OASLM.

Lenses of the second lens array may be arranged so as to transmit the recording beams through intervals between the mirror members of the mirror member array.

The second lens array and the mirror member array may be arranged such that the lenses and the mirror members are alternately located.

According to an aspect of another exemplary embodiment, a method of operating an optically addressable spatial light modulator (OASLM)-based holographic display, the method includes providing a recording light including a plurality of recording beams that are modulated by turning on and turning off the recording beams on a pixel-by-pixel basis, based on hologram information about a stereoscopic image; forming a plurality of pixel images on an OASLM by scanning the recording beams to be incident on the OASLM using each of driving mirrors of a driving mirror array; providing a reproduction beam to the OASLM; and modulating and diffracting the reproduction beam incident on the OASLM by optically addressing the OASLM with the recording beams, so that a holographic image is reproduced.

The providing of the recording beams may include providing the recording beams using a self-emitting light source, which is pixilated, and modulating the recording beams based on the hologram information about a stereoscopic image.

According to an aspect of another exemplary embodiment, a method of operating an optically addressable spatial light modulator (OASLM)-based holographic display, the method includes forming a plurality of recording beams that are modulated by turning on and turning off incident recording beams on a pixel-by-pixel basis, based on hologram information about a stereoscopic image, wherein the turning on and turning off is performed using driving mirrors of a driving mirror array, and directing the modulated recording beams to an OASLM; providing a reproduction beam to the OASLM; and modulating and diffracting the reproduction beam incident on the OASLM by optically addressing the OASLM using the modulated recording beams, so that a holographic image is reproduced.

The method may further include collimating the recording beams so as to cause the recording beams being collimated to be directed toward the driving mirror array.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
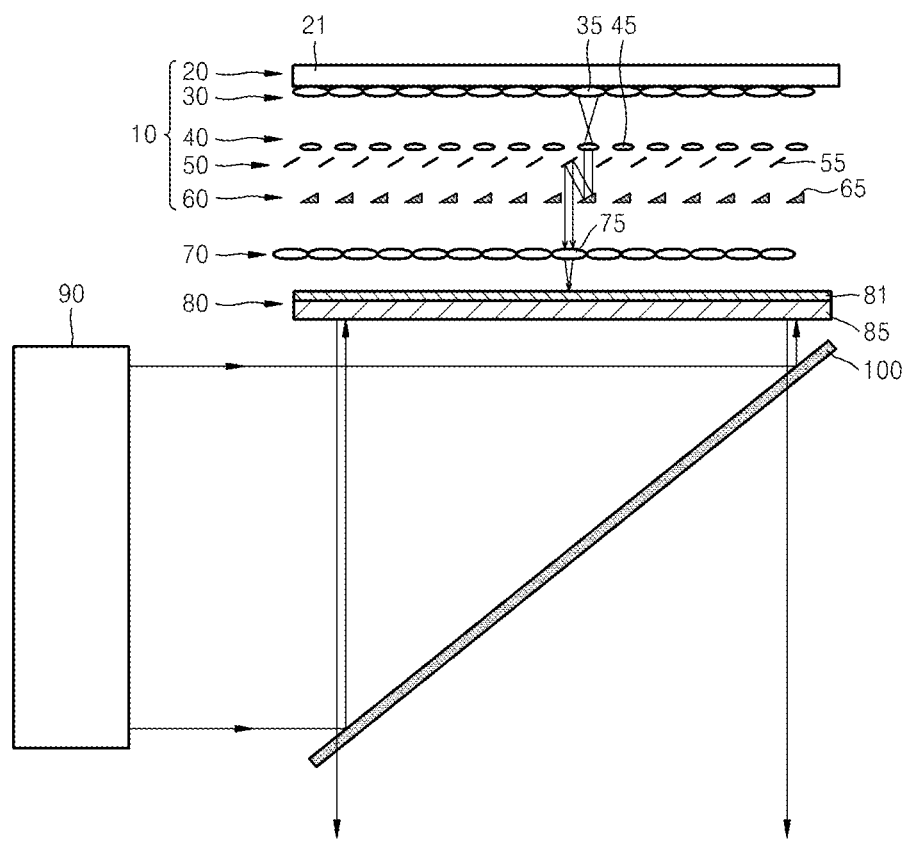
FIG. 1 is a schematic diagram illustrating an optically addressable spatial light modulator (OASLM)-based holographic display according to an exemplary embodiment of the inventive concept.

Hereinafter, an OASLM-based holographic display according to an exemplary embodiment of the inventive concept will be described in detail with reference to the accompanying drawings. In the drawings, the width and thicknesses of layers and regions are exaggerated for clarity of the specification Like reference numerals denote like elements throughout the specification. As used herein, the term "and/or" includes any and all combinations of one or more of the associated listed items.

Figure 2:
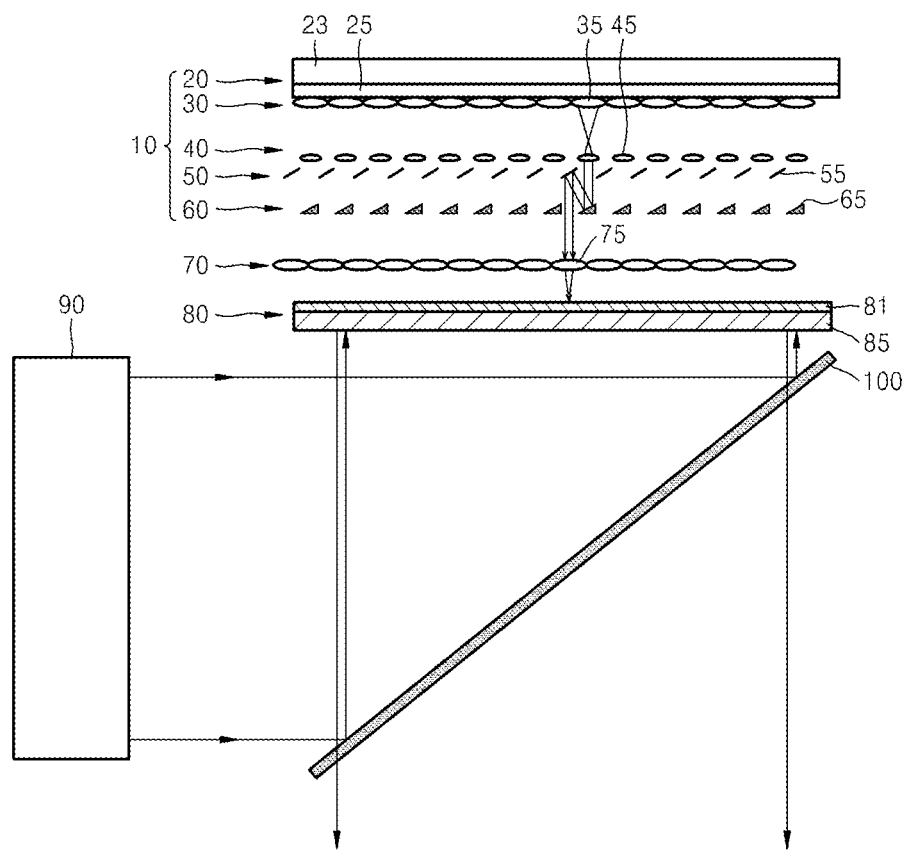
FIG. 2 is a schematic diagram illustrating an OASLM-based holographic display according to another exemplary embodiment of the inventive concept.

FIG. 1 is a schematic diagram illustrating an OASLM-based holographic display according to an exemplary embodiment of the inventive concept. FIG. 2 is a schematic diagram illustrating an OASLM-based holographic display according to another exemplary embodiment of the inventive concept.

Referring to FIGS. 1 and 2, the OASLM-based holographic display (hereinafter, simply referred to as a holographic display) includes an addressing unit 10 for providing recording light comprising a plurality of recording beams that are modulated on the basis of hologram information about a stereoscopic image, a lenslet array 70 including a plurality of micro lenses 75 that are arranged in an array and focus the recording beams incident thereon from the addressing unit 10, a reproduction beam providing unit 90 for providing a reproduction beam, and an OASLM 80 that is optically addressed by the recording beams and thus reproduces a holographic image by modulating and diffracting the reproduction beam. When the OASLM 80 is a reflective type, the holographic display may further include a light path conversion member 100 that reflects the reproduction beam incident thereon from the reproduction beam providing unit 90 so as to cause the reproduction beam to be directed toward the OASLM 80, and that transmits a reproduction beam that is optically addressed by the recording beams to be modulated and diffracted. The holographic display may be provided such that the reproduction beam incident thereon from the reproduction beam providing unit 90 passes through the light path conversion member 100 to be directed toward the OASLM 80 and that the reproduction beam, which is optically addressed by the recording beams to be modulated and diffracted, is reflected by the light path conversion member 100.

The addressing unit 10 includes a light source unit 20 for providing a recording light comprising a plurality of recording beams, a driving mirror array 50 including driving mirrors 55 that are arranged at predetermined intervals and reflect the recording beams incident thereon, and a mirror member array 60 including mirror members 65 that are arranged at predetermined intervals and obliquely reflect the recording beams incident thereon. The driving mirror 55 and the mirror member 65 are provided to correspond to each other. The addressing unit 10 may further include a first lens array 30 and a second lens array 40 so as to provide collimated recording beams.

The light source unit 20 turns recording beams on and off in pixel units on the basis of hologram information (for example, a CGH signal) about a stereoscopic image, and thus provides modulated recording beams. For example, as shown in FIG. 1, the light source unit 20 may include a self-emitting light source 21 that is pixelated, such as, for example, an organic light-emitting diode (OLED) or an active matrix OLED (AMOLED) light source. The self-emitting light source 21 provides the recording light that is modulated on the basis of the hologram information about a stereoscopic image. As another example, as shown in FIG. 2, the light source unit 20 may include a light source 23 and a spatial light modulator 25 that modulates the recording beams incident thereon from the light source 23 in pixel units on the basis of the hologram information about a stereoscopic image, thereby providing the modulated recording beams. The spatial light modulator 25 may be an electrically addressable spatial light modulator (EASLM). The spatial light modulator 25 modulates recording beams that are incident thereon from the light source 23 on the basis of the hologram information, and may include, for example, any one of a digital micromirror device (DMD), a liquid crystal on silicon (LCoS), and a liquid crystal device (LCD).

The light source unit 20 may use a laser that emits a coherent beam, but may also use a light source having no coherency in order to provide recording beams. Recording light having a short wavelength may be used so as to further reduce a size of a spot of a recording beam that is focused on the OASLM 80. For example, green light having a wavelength of approximately 530 nm may be used as recording light. For example, the light source unit 20 may use a green single-colored OLED or AMOLED display having a wavelength of approximately 530 nm as the self-emitting light source 21. A recording beam emitted from each pixel of such a single-colored OLED or AMOLED display is focused as a spot by each of lenses 35 of the adjacent first lens array 30. A numerical aperture NA of the lens 35 may be designed so as to effectively couple light to a lens of the adjacent array which has a small aperture, that is, each lens 45 of the second lens array 40. The lens 45 collimates a recording beam that is incident on a pixel of the driving mirror 55 of the driving mirror array 50.

That is, the recording beams that are emitted from the light source unit 20 is focused by the first lens array 30, and then, the recording beams are dispersed, condensed by the second lens array 40, and collimated. The first lens array 30 and the second lens array 40 are provided such that the lenses 35 and the lenses 45 correspond to each other on a one-to-one basis. Therefore, the recording beams, which are modulated in pixel units in the light source unit 20, are focused by lenses 35 of the first lens array 30 and condensed by lenses 45 of the second lens array 40, and are then collimated to form a parallel beam.

The lenses 45 of the second lens array 40 may be arranged so as to transmit the recording beams through the intervals between the driving mirrors 55 of the driving mirror array 50. That is, the second lens array 40 may be located between the first lens array 30 and the driving mirror array 50, and may be arranged such that the lenses 45 and the driving mirrors 55 are alternately located. Here, the intervals between the lenses 45 of the second lens array 40 and the intervals between the driving mirrors 55 of the driving mirror array 50 may be formed as transparent regions or empty spaces.

Each of the mirror members 65 of the mirror member array 60 obliquely reflect the recording beam incident thereon from the light source unit 20 in pixel units so as to cause the reflected recording beam to be directed toward a corresponding driving mirror 55 of the driving mirror array 50. Here, the intervals between the mirror members 65 of the mirror member array 60 may be formed as transparent regions or empty spaces.

The driving mirrors 55 of the driving mirror array 50 may scan the recording beam incident thereon from the mirror members 65 of the mirror member array 60. Each of the driving mirrors 55 may be a biaxial scanner, and the recording beam scanned by the driving mirror 55 may be focused on one of N×N positions on the OASLM 80 which is focal plane with respect to each of the micro lenses 75 of the lenslet array 70.

Figure 3:
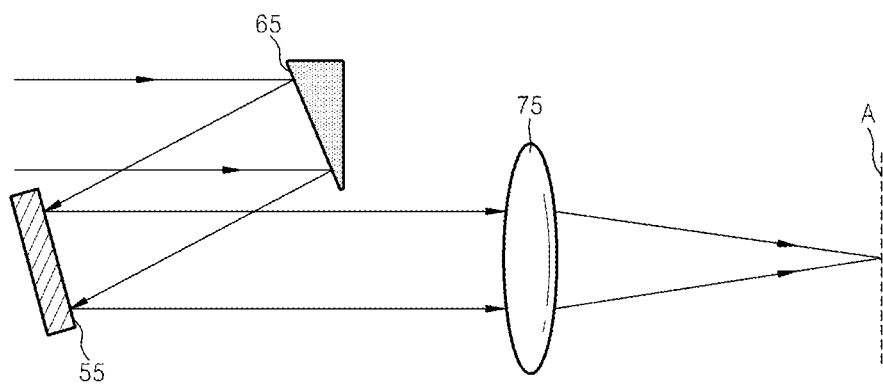
FIG. 3 is a diagram illustrating a light path along which a recording beam incident on one mirror member of a mirror member array passes through a corresponding driving mirror of a driving mirror array and is then focused on an imaging plane by a corresponding micro lens of a lenslet array.
Figure 4A:
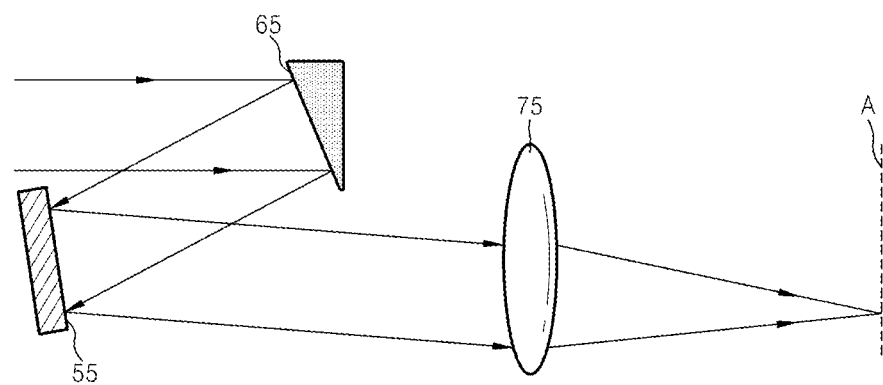
FIGS. 4A to 4C are diagrams illustrating variations in position of a recording beam that is focused on an imaging plane in accordance with the scanning of the driving mirror.
Figure 4B:
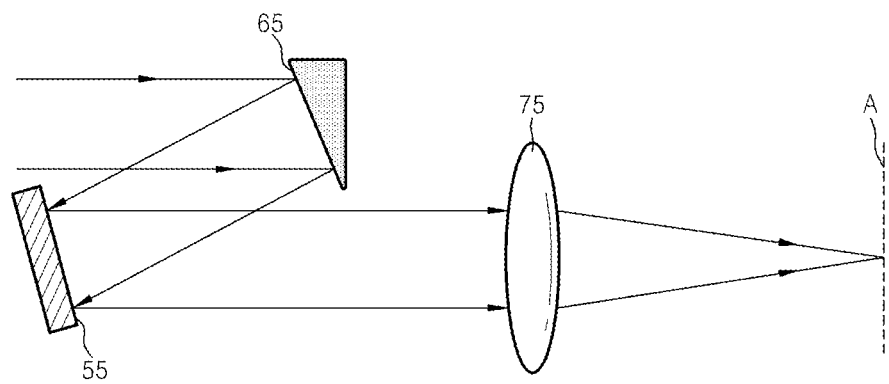
Figure 4C:
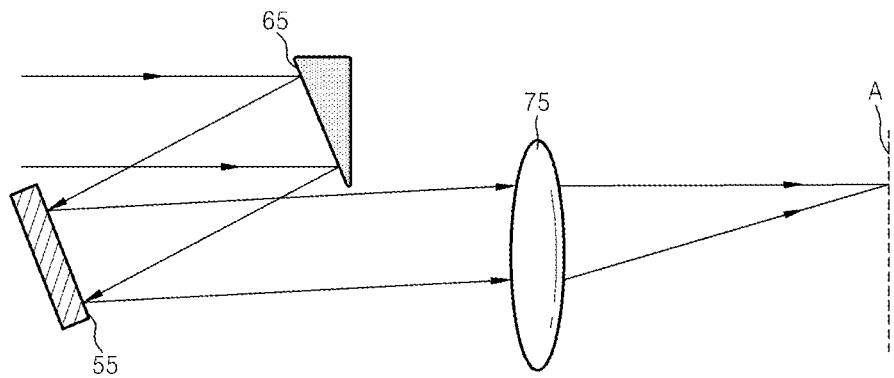

FIG. 3 is a diagram illustrating a light path along which a recording beam incident on one mirror member 65 of the mirror member array 60 passes through the corresponding driving mirror 55 of the driving mirror array 50 and is then focused on a focal plane A by a corresponding micro lens 75 of the lenslet array 70. FIGS. 4A to 4C are diagrams illustrating variations in position of the recording beam that is focused on the focal plane A in accordance with the scanning of the driving mirror 55.

Figure 5:
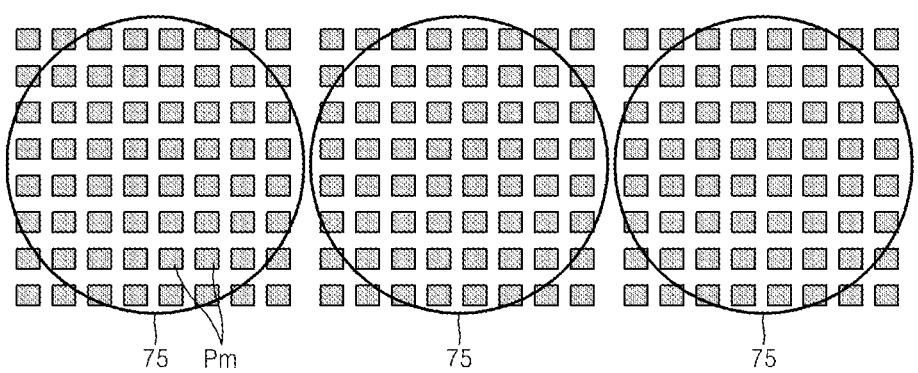
FIG. 5 is a diagram illustrating an example in which N×N pixel images, for example, 8×8 pixel images, are formed on the OASLM through the scanning of the driving mirror with respect to each micro lens.

In this manner, when the recording beam is scanned by the driving mirror 55, a plurality of pixel images may be formed on the OASLM 80 with respect to the micro lenses 75 of the lenslet array 70. FIG. 5 is a diagram illustrating an example in which N×N pixel images, for example, 8×8 pixel images Pm, are formed on the OASLM through the scanning of the driving mirror 55 with respect to each of the micro lenses 75.

In this manner, when the recording beam is scanned by the driving mirror 55, N×N pixel images Pm, as well as one pixel image, may be formed with respect to a single micro lens 75. Thus, a resolution of the holographic display may be greatly increased, and a pixel image Pm having a size of approximately 1 μm may be formed. In this manner, when the recording beam is focused on a region as small as approximately 1 μm, the reproduction beam, which is optically addressed by the recording beam and is then modulated, is more likely to be diffracted. Thus, a 3D holographic image may be reproduced at a viewing angle of approximately 30 degrees or more.

The OASLM 80 may include a photocurrent forming layer 81 and an electro-optic light modulation layer 85, and may be configured as a reflective OASLM.

The photocurrent forming layer 81 is optically addressed by the modulated recording beams that are provided from the addressing unit 10 to thereby generate a photocurrent in a portion thereof which is irradiated with the recording beams. When the photocurrent is generated in the portion of the photocurrent forming layer 81 which is irradiated with the recording beams, an effective voltage of the electro-optic light modulation layer 85 corresponding thereto changes, and thus a phase and/or an amplitude of a beam to be modulated, for example, a reproduction beam of a visible light region, may be modulated.

Figure 6:
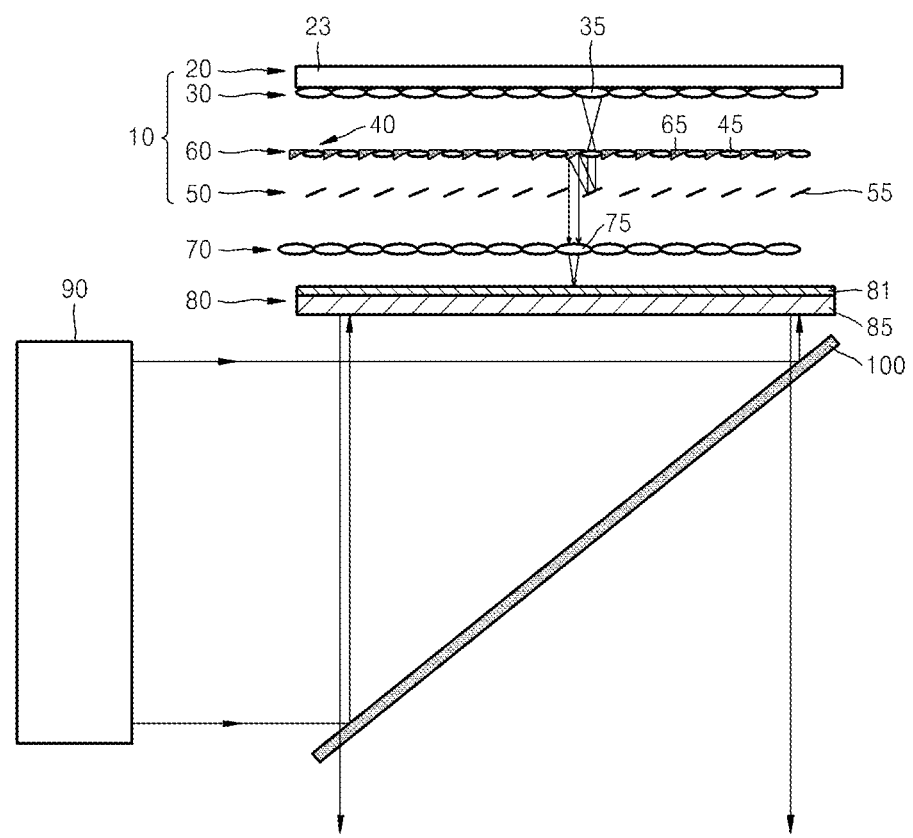
FIG. 6 is a schematic diagram illustrating an OASLM-based holographic display according to another embodiment of the inventive concept.

The electro-optic light modulation layer 85 is a layer for using the photoelectric conversion of an addressed recording beam to convert an effective voltage in accordance with the generation of the photocurrent in the photocurrent forming layer 81, and thus modulating the reproduction beam. The electro-optic light modulation layer 85 may be, for example, a liquid crystal light modulation layer so as to modulate polarization of the reproduction beam that is incident thereon by using liquid crystals. FIGS. 1 and 2, and FIG. 6, which will be described below, show an example in which the electro-optic light modulation layer 85 reflects the reproduction beam that is optically addressed and then modulated. For example, the liquid crystal light modulation layer may further include a reflective mirror layer or may use ferroelectric liquid crystals so that the reproduction beam is not reflected in a portion irradiated with a recording beam.

For example, a transparent electrode (not shown) may be disposed on top and bottom surfaces of the photocurrent forming layer 81. When a voltage is applied to the transparent electrode, if a recording beam is not incident on the photocurrent forming layer 81, a resistance of the photocurrent forming layer 81 is great, and thus a voltage drop mainly occurs in the photocurrent forming layer 81. Accordingly, since the electro-optic light modulation layer 85, for example, the liquid crystal light modulation layer is in an off-state, the arrangement of liquid crystals within the liquid crystal light modulation layer does not change. On the other hand, when a recording beam is incident on the photocurrent forming layer 81, a resistance of the photocurrent forming layer 81 is decreased, and thus a voltage drop mainly occurs in the liquid crystal light modulation layer. Then, the liquid crystal light modulation layer is turned on, and thus the arrangement of liquid crystals within the liquid crystal light modulation layer may change. Based on such a principle, the OASLM 80 modulates the reproduction beam incident on the electro-optic light modulation layer 85, for example, the liquid crystal light modulation layer, by the optical addressing of the recording beam that is modulated on the basis of hologram information, thereby allowing a 3D holographic image to be reproduced.

The reproduction beam providing unit 90 provides a reproduction beam to the OASLM 80. At this time, the reproduction beam may be a coherent beam. The reproduction beam provided from the reproduction beam providing unit 90 is optically addressed by the recording beams, which are modulated on a pixel-by-pixel basis on the basis of the hologram information about a stereoscopic image. Thus, the reproduction beam is modulated, thereby allowing a 3D holographic image to be reproduced. The reproduction beam providing unit 90 may sequentially provide, for example, R, G, and B reproduction beams, and thus the holographic display according to this exemplary embodiment may reproduce a 3D color holographic image.

The light path conversion member 100 is a member for converting a path of a reproduction beam incident thereon. For example, the light path conversion member 100 may be a polarization beam splitter so as to reflect the reproduction beam that is incident thereon from the reproduction beam providing unit 90 and to transmit the reproduction beam that is modulated, reflected, and diffracted by the OASLM 80.

When the electro-optic light modulation layer 85 of the OASLM 80 is provided as a liquid crystal light modulation layer, the reproduction beam, which is modulated, reflected, and diffracted in a portion of the electro-optic light modulation layer 85 which is irradiated with the recording beams, may have a polarizing component which is orthogonal to the polarization of the reproduction beam that is provided from the reproduction beam providing unit 90, is reflected by the light path conversion member 100, configured as a polarization beam splitter, and is incident on the OASLM 80. An orthogonal polarization component of the reproduction beam, which is orthogonal, corresponds to hologram information, and only the orthogonal polarization component of reproduction beam passes through the light path conversion member 100, configured as a polarization beam splitter, and thus a 3D holographic image may be reproduced.

In the above-mentioned holographic display according to an exemplary embodiment of the inventive concept, the recording beam, which is modulated by turning on and turning off recording beams on a pixel-by-pixel basis on the basis of hologram information about a stereoscopic image, is provided, and each of the driving mirrors 55 of the driving mirror array 50 scans a recording beam incident thereon, and thus a plurality of pixel images Pm are formed on the OASLM 80 with respect to each of the micro lenses 75 of the lenslet array 70. The recording beams are collimated by the first lens array 30 and the second lens array 40. The reproduction beam is incident on the OASLM 80, and the OASLM 80 modulates and diffracts the reproduction beam which is incident thereon by being optically addressed by the recording beams, and thus a 3D holographic image may be reproduced. At this time, when R, G, and B reproduction beams are sequentially input to the OASLM 80 from the reproduction beam providing unit 90, a 3D color holographic image may be reproduced.

FIG. 6 is a schematic diagram illustrating an OASLM-based holographic display according to another exemplary embodiment of the inventive concept. The light source unit 20 includes the light source 23 that is provided so as to emit a continuous beam, and the driving mirrors 55 of the driving mirror array 50 are provided so as to form recording beams that are modulated on a pixel-by-pixel bases on the basis of hologram information about a stereoscopic image by turning on and turning off a recording beam which is incident thereon from the light source 23. Here, components that are substantially the same as those of FIGS. 1 and 2 are denoted by the same reference numerals, and a repeated description thereof will be omitted.

Referring to FIG. 6, the addressing unit 10 includes the light source unit 20, for providing recording light comprising a plurality of recording beams; the driving mirror array 50, including the driving mirrors 55 that are arranged at predetermined intervals and reflect the recording beams incident thereon; and the mirror member array 60, including the mirror members 65 that are arranged at predetermined intervals and obliquely reflect the recording beams incident thereon. The driving mirrors 55 and the mirror member 65 are provided to correspond to each other. The addressing unit 10 may further include the first lens array 30 and the second lens array 40 so as to provide collimated recording beams.

The light source unit 20 includes the light source 23, and the light source 23 may be provided so as to emit a continuous beam.

A recording beam emitted from the light source 23 is focused by the first lens array 30, and then is dispersed. The recording beam which has been focused and then dispersed is then condensed by the second lens array 40, thereby being emitted from the second lens array 40 as a collimated beam. The first lens array 30 and the second lens array 40 are provided such that the lenses 35 and lenses 45 correspond to each other on a one-to-one basis. Therefore, a recording beam, which is emitted from the light source 23, is focused by the lenses 35 of the first lens array 30, is then condensed by the lenses 45 of the second lens array 40, and is finally collimated to form of a parallel beam.

The lenses 45 of the second lens array 40 may be arranged between adjacent mirror members 65 of the mirror member array 60, so as to transmit the recording beams through the intervals between the mirror members 65. That is, the second lens array 40 and the mirror member array 60 may be arranged such that the lenses 45 and the mirror members 65 are alternately located on the same plane.

The driving mirrors 55 of the driving mirror array 50 modulate the recording beams by turning on and turning off a beam, which is incident thereon from the light source 23, in pixel units on the basis of hologram information about a stereoscopic image.

The mirror members 65 of the mirror member array 60 obliquely reflect the recording beams, which have been reflected from the driving mirrors 55, on a pixel-by-pixel basis, so as to cause the recording beams to be directed toward the OASLM 80.

Figure 7A:
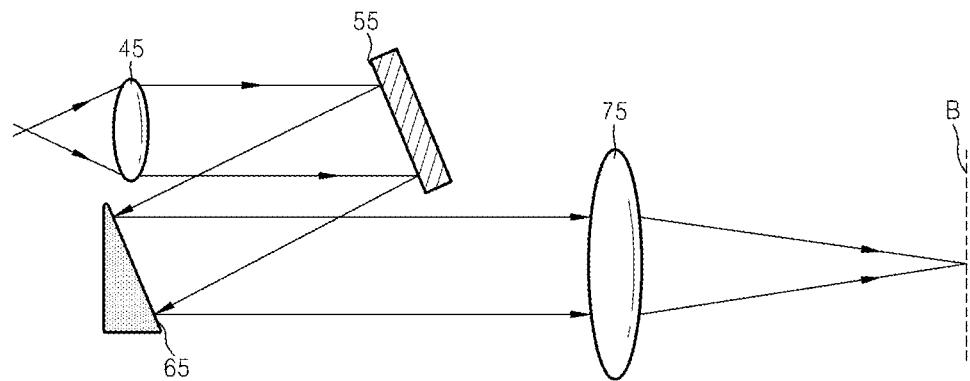
FIGS. 7A and 7B show an operation state when a recording beam is turned on and turned off in pixel units on the basis of hologram information about a stereoscopic image according to the driving of a driving mirror.
Figure 7B:
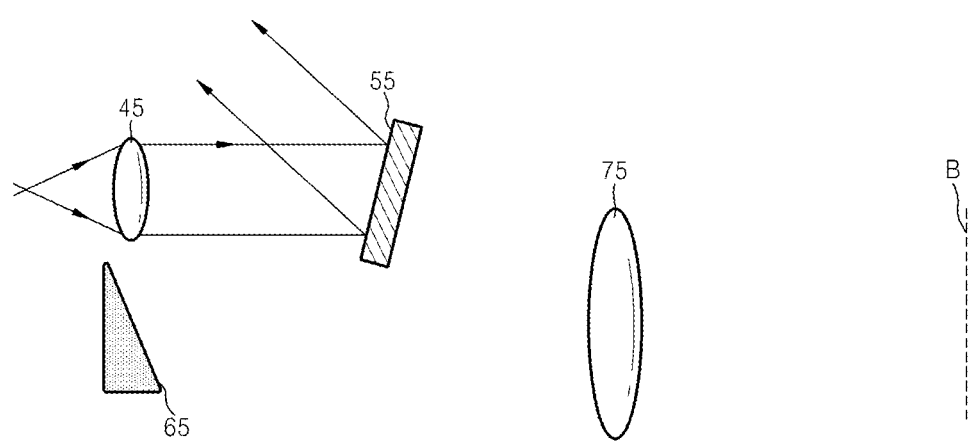

FIGS. 7A and 7B show an operation state when a recording beam is turned on and turned off on a pixel-by-pixel basis on the basis of hologram information about a stereoscopic image according to the driving of the driving mirror 55.

FIG. 7A shows a light path in an on-state where a recording beam incident on one driving mirror 55 of the driving mirror array 50 passes through corresponding mirror member 65 of the mirror member array 60 and is then focused on a focal plane B, that is, on the OASLM 80, by corresponding micro lens 75 of the lenslet array 70. FIG. 7B shows a light path in an off-state where a recording beam incident on one driving mirror 55 of the driving mirror array 50 is reflected in a different direction according to the driving of the driving mirror 55 of the driving mirror array 50.

In a holographic display according to another exemplary embodiment of the inventive concept, the driving mirrors 55 of the driving mirror array 50 modulate the recording beams by turning on and turning off the recording beams incident thereon on a pixel-by-pixel basis on the basis of hologram information about a stereoscopic image, and then the modulated recording beams are made incident on the OASLM 80. A reproduction beam which, is provided from the reproduction beam providing unit 90, is modulated and diffracted by optically addressing the OASLM 80 by the modulated recording beams, and thus a holographic image may be reproduced. The recording beams emitted from the light source 23 are collimated and made incident on the driving mirror array 50.

As described above, according to one or more exemplary embodiments, an OASLM-based holographic display and a method of operating the OASLM-based holographic display may reproduce a high quality 3D hologram image by using a driving mirror to reduce the size of a spot of a recording beam irradiated on the OASLM so as to more effectively diffract a modulated reproduction beam.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An optically addressable spatial light modulator (OASLM)-based holographic display comprising:
   an addressing unit comprising:
      a light source unit which emits a recording beam,
      a first lens array, comprising a plurality of first lenses, wherein each of the plurality of first lenses focuses the recording beam incident thereon from the light source unit,
      a second lens array comprising a plurality of second lenses, wherein each of the plurality of second lenses condenses the recording beam incident thereon from the first lens array, thereby emitting the recording beam which is collimated,
      a mirror member array comprising an array of a plurality of mirror members, wherein each of the plurality of mirror members obliquely reflects the recording beam incident thereon, and
      a driving mirror array comprising an array of a plurality of driving mirrors, wherein each of the plurality of driving mirrors reflects the recording beam incident thereon,
      wherein each of the plurality of driving mirrors corresponds to each of the plurality of mirror members, respectively, and
      wherein the addressing unit provides a plurality of recording beams modulated by hologram information about a stereoscopic image;
   a lenslet array comprising an array of a plurality of micro lenses, wherein each of the plurality of micro lenses focuses each of the plurality of recording beams incident thereon from the addressing unit;
   a reproduction beam providing unit which emits a reproduction beam; and
   an OASLM provided on an optical path between the lenslet array and the reproduction beam providing unit, wherein the OASLM is optically addressed by the plurality of recording beams incident thereon having been transmitted by the addressing unit and focused by the lenslet array, wherein the OASLM modulates and diffracts the reproduction beam incident thereon from the reproduction beam providing unit, so that a holographic image is reproduced, and
   wherein each of the driving mirrors is a biaxial scanner.

2. The holographic display of claim 1,
   wherein the light source unit turns the recording beam on and off on a pixel-by-pixel basis based on the hologram information about the stereoscopic image to generate the plurality of recording beams, and
   wherein the recording beam reflected by each of the plurality of mirror members is incident on each of the plurality of driving mirrors, and each of the plurality of driving mirrors scans the recording beam incident thereon, thereby transmitting the recording beam through one of the plurality of micro lenses and onto the OASLM, forming a plurality of pixel images on the OASLM.

3. The holographic display of claim 2, wherein the light source unit comprises a self-emitting light source, which is pixilated.

4. The holographic display of claim 2, wherein the light source unit comprises:
   a light source which emits the recording beam; and
   a spatial light modulator which modulates the recording beam, incident thereon from the light source, on the pixel-by-pixel basis based on the hologram information of the stereoscopic image, and thereby provides the plurality of recording beams.

5. The holographic display of claim 2, wherein each of the plurality of first lenses corresponds to each of the plurality of second lenses, respectively.

6. The holographic display of claim 5, wherein each of the plurality of second lenses transmits the collimated recording beam through an interval between adjacent driving mirrors of the driving mirror array.

7. The holographic display of claim 6, wherein the second lens array is provided on an optical path between the first lens array and the driving mirror array.

8. The holographic display of claim 1, wherein the recording beam emitted by the light source unit is continuously emitted,
  wherein each of the plurality of driving mirrors turn the recording beam, incident thereon from the light source unit, on and off based on the hologram information of the stereoscopic image, and thereby provides the plurality of recording beams modulated on a pixel-by-pixel basis, and
  wherein each of the plurality of mirror members obliquely reflect each of the recording beams incident thereon from each of the plurality of driving mirrors toward the OASLM.

9. The holographic display of claim 8, wherein each of the plurality of first lenses corresponds to each of the plurality of second lenses, respectively.

10. The holographic display of claim 9, wherein each of the plurality of second lenses transmits the recording beam through an interval between adjacent mirror members of the mirror member array.

11. The holographic display of claim 10, wherein the plurality of second lenses of the second lens array and the plurality of mirror members of the mirror member array are arranged such that the plurality of second lenses and the plurality of mirror members are alternately disposed.

12. The holographic display of claim 1, wherein each of the plurality of first lenses corresponds to each of the plurality of second lenses, respectively.

13. The holographic display of claim 12, wherein each of the plurality of second lenses transmits the recording beam through an interval between adjacent driving mirrors of the driving mirror array.

14. The holographic display of claim 13, wherein the second lens array is provided on an optical path between the first lens array and the driving mirror array.

15. The holographic display of claim 12, wherein each of the plurality of second lenses transmits the recording beam through an interval between adjacent mirror members of the mirror member array.

16. The holographic display of claim 15, wherein the plurality of second lenses of the second lens array and the plurality of mirror members of the mirror member array are arranged such that the plurality of second lenses and the plurality of mirror members are alternately disposed.

17. A method of operating an optically addressable spatial light modulator (OASLM)-based holographic display, the method comprising:
  focusing, by a first lens array comprising a plurality of first lenses, a plurality of recording beams emitted from a light source;
  collimating, by a second lens array comprising a plurality of second lenses, the plurality of recording beams focused by the first lens array;
  reflecting, by a mirror member comprising an array of a plurality of mirror members, the plurality of recording beams collimated by the second lens array;
  reflecting, by a driving mirror array comprising a plurality of driving mirrors, the plurality of recording beams reflected by the mirror member, wherein each of the plurality of driving mirrors corresponds to each of the plurality of mirror members, respectively;
  providing a plurality of modulated recording beams by using the plurality of driving mirrors of the driving mirror array to turn on and turn off the plurality of recording beams on a pixel-by-pixel basis, based on hologram information about a stereoscopic image;
  focusing, by a lenslet array comprising an array of a plurality of micro lenses, the plurality of modulated recording beams provided by the driving mirror array;
  forming a plurality of pixel images on an OASLM by scanning each of the plurality of modulated recording beams to be incident on the OASLM using each of the plurality of driving mirrors of the driving mirror array;
  making a reproduction beam incident on the OASLM; and
  modulating and diffracting the reproduction beam incident on the OASLM by optically addressing the OASLM using the plurality of recording beams incident thereon, so that a holographic image is reproduced,
  wherein the forming comprises scanning the plurality of modulated recording beams to be incident on the OASLM using each of the plurality of driving mirrors which are implemented as biaxial scanners.

18. The method of claim 17, wherein the providing the plurality of modulated recording beams comprises one of using a self-emitting light source on a pixel-by-pixel basis to provide the plurality of modulated recording beams based on the hologram information about the stereoscopic image, or modulating a beam from the light source on a pixel-by-pixel basis based on the hologram information about the stereoscopic image.

19. The method of claim 17, further comprising collimating the plurality of recording beams prior to the plurality of recording beams being incident on a mirror member array.

20. A method of operating an optically addressable spatial light modulator (OASLM)-based holographic display, the method comprising:
  focusing a plurality of recording beams from a light source by using a first lens array comprising a plurality of first lenses;
  collimating, by a second lens array comprising a plurality of second lenses, the plurality of recording beams focused by the first lens array;
  reflecting, by a mirror member comprising an array of a plurality of mirror members the plurality of recording beams collimated by the second lens array;
  reflecting, by a driving mirror array comprising an array of a plurality of driving mirrors, the plurality of recording beams reflected by the mirror member, wherein each of the plurality of driving mirrors corresponds to each of the plurality of mirror members, respectively;
  providing a plurality of modulated recording beams by using the plurality of driving mirrors of the driving mirror array to turn on and turn off the plurality of recording beams on a pixel-by-pixel basis, based on hologram information about a stereoscopic image;
  focusing, by a lenslet array comprising an array of a plurality of micro lenses, the plurality of modulated recording beams provided by the driving mirror array;

directing the plurality of modulated recording beams from the driving mirror array to be incident on an OASLM;
making a reproduction beam incident on the OASLM; and
modulating and diffracting the reproduction beam incident on the OASLM by optically addressing the OASLM using the plurality of recording beams incident thereon, so that a holographic image is reproduced,
wherein the providing the plurality of modulated recording beams comprises modulating the plurality of recording beams by using the plurality of driving mirrors which are implemented as biaxial scanners.

* * * * *